United States Patent
Valentin et al.

(10) Patent No.: US 9,146,958 B2
(45) Date of Patent: Sep. 29, 2015

(54) SYSTEM AND METHOD FOR REPORT TO REPORT GENERATION

(71) Applicants: Marco Valentin, Malsch (DE);
Christian Gaertner, Oestringen (DE)

(72) Inventors: Marco Valentin, Malsch (DE);
Christian Gaertner, Oestringen (DE)

(73) Assignee: SAP SE, Walldorf (DE)

(*) Notice: Subject to any disclaimer, the term of this patent is extended or adjusted under 35 U.S.C. 154(b) by 187 days.

(21) Appl. No.: 13/949,446

(22) Filed: Jul. 24, 2013

(65) Prior Publication Data

US 2015/0032721 A1  Jan. 29, 2015

(51) Int. Cl.
*G06F 17/30* (2006.01)
*H04L 29/08* (2006.01)

(52) U.S. Cl.
CPC .... *G06F 17/30466* (2013.01); *G06F 17/30477* (2013.01); *H04L 67/025* (2013.01)

(58) Field of Classification Search
CPC ................................ G06F 17/30; G06F 17/00
USPC .................................................. 707/600–899
See application file for complete search history.

(56) References Cited

U.S. PATENT DOCUMENTS

| | | | |
|---|---|---|---|
| 5,903,890 A | 5/1999 | Shoji et al. | |
| 6,772,150 B1 | 8/2004 | Whitman et al. | |
| 7,031,311 B2 | 4/2006 | MeLampy et al. | |
| 7,103,605 B1 | 9/2006 | Hazi et al. | |
| 7,188,100 B2 | 3/2007 | De Bellis et al. | |
| 7,617,177 B2 | 11/2009 | Bukary et al. | |
| 7,693,834 B2 | 4/2010 | Gross et al. | |
| 7,725,947 B2 | 5/2010 | Bukary et al. | |
| 7,756,822 B2 | 7/2010 | Danner et al. | |
| 8,290,926 B2 | 10/2012 | Ozzie et al. | |
| 8,407,216 B2 | 3/2013 | Walker et al. | |
| 2004/0103087 A1 | 5/2004 | Mukherjee et al. | |
| 2009/0287726 A1 | 11/2009 | Verhoeven | |
| 2010/0161344 A1* | 6/2010 | Dyson | 705/1.1 |
| 2012/0291079 A1 | 11/2012 | Gordon et al. | |

OTHER PUBLICATIONS

"Report-Report Interface", Release 640, SAP Business Information Warehouse, (2003), 1-19.

* cited by examiner

*Primary Examiner* — Isaac M Woo
(74) *Attorney, Agent, or Firm* — Schwegman Lundberg & Woessner, P.A.

(57) ABSTRACT

In an example embodiment a sender report containing multiple rows and/or columns of information drawn from a data table may be displayed to a user of a machine. A user may select a portion of the displayed information. A sender adaptor may extract report-to-report selection criteria from the selected information. A receiver adaptor may identify other data tables where information related to the report-to-report selection criteria resides. If such information resides in multiple data tables, the receiver adaptor may join the multiple data tables into one or more data tables. The receiver adaptor may convert the report-to-report selection criteria into selection criteria for the identified data table(s) or joined data table(s). The selection criteria may be passed to a generic receiver report adapted to retrieve any information from any data table(s). The generic receiver report may retrieve information according to the selection criteria and display the information to the user.

20 Claims, 6 Drawing Sheets

SYSTEM AND METHOD FOR REPORT TO REPORT GENERATION

TECHNICAL FIELD

This disclosure relates to information storage and retrieval, such as by databases. More particularly, this disclosure relates to displaying a report to a user and allowing the user to select information from the displayed report that is subsequently used to create selection criteria for other data tables within databases associated with a system.

BACKGROUND

Report-to-report functionality may be used to connect reports within a system. This functionality, however, requires custom tailored sender and receiver reports to make sure that they "fit together" in their definition, selection criteria and database tables. No general way exists that allows general information from one report to be used to select information that may reside in other places in the system.

DETAILED DESCRIPTION

The description that follows includes illustrative systems, methods, techniques, instruction sequences, and computing machine program products of illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Figure 1:
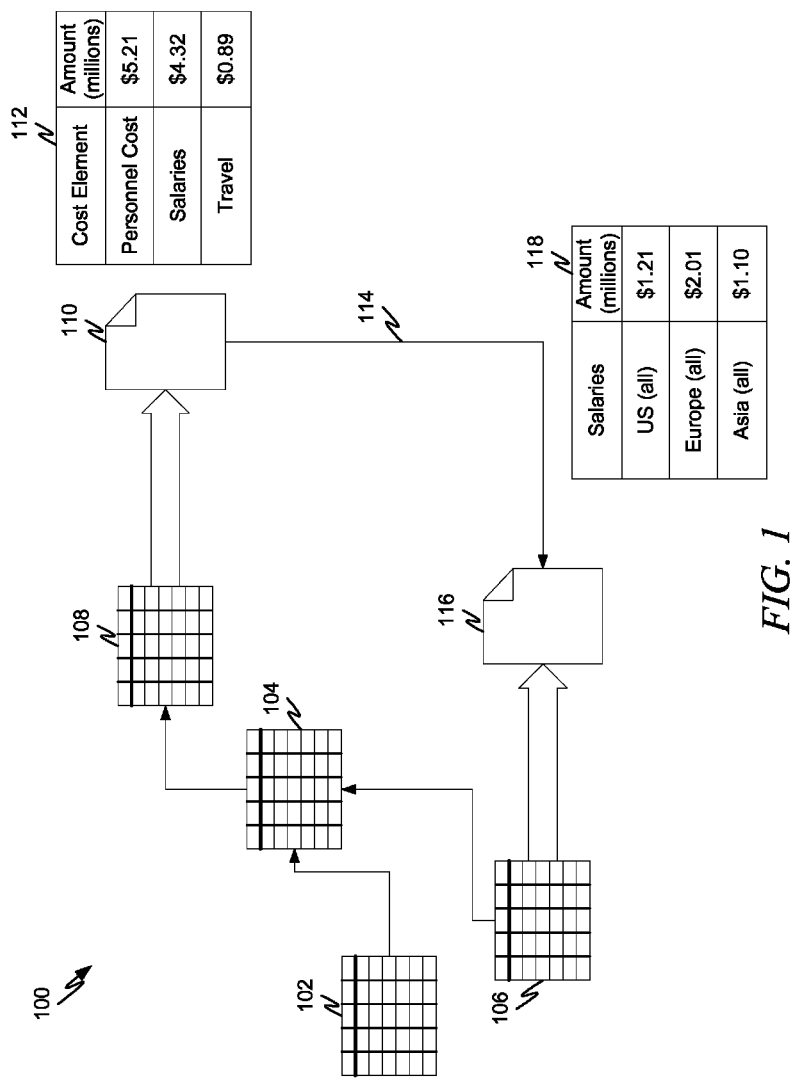
FIG. 1 is a diagram illustrating a representative report-to-report connection.

FIG. 1 illustrates a representative report-to-report connection generally as 100. Enterprise Resource Planning (ERP) systems or other lines of business applications typically utilize data tables (also called database tables) stored in one or more databases. In this disclosure, data tables, database tables, and tables may be used interchangeably. Representative data tables are illustrated as 102, 104, 106, and 108. Data tables typically comprise a plurality of rows and columns. Columns generally contain different data fields while rows generally contain values for the various data fields. Data tables may have relationships that relate records (rows) of one table to records (rows) of other tables. For example, one table may contain employees (first name, last name) and another may contain job titles and still another may contain facility names and locations. An employee may be related to a job title and a facility name and location. Relationships may also occur where one table contains "detail" and a related table contains higher-level "summary" information.

In FIG. 1, data tables 102 and 106 are related to data table 104 and data table 104 is related to data table 108. Relationships may be one-to-one, one-to-many, or many-to-many. Data from a table (or from multiple tables) may be selected and placed into a report for viewing or other purposes. In FIG. 1, data from data table 108 is selected and presented in report 110. As an example, report 110 may comprise the information in table 112, which includes a summary of various corporate costs such as personnel costs, salaries and travel costs.

According to the present disclosure, a user may select all or a portion of the displayed information and use that to display a second report of information related to the selected information. The selected information 114 may be used as discussed more fully below to locate the appropriate table or tables where related information resides. Appropriate selection criteria may then be created for the identified tables. The selection criteria may then be used to extract the desired information into a report 110.

In the Example of FIG. 1, the selected information 114 comprises the salaries row. Data table 106 contains the detail information for the selected salary row. Appropriate select criteria may be used to extract the desired information from data table 106 into report 116. In this example, report 116 contains the information in table 118, which includes the salary breakdown showing salaries from the US, Europe and Asia.

Thus, in an example embodiment a method may comprise receiving a selection of information from a report 110 generated from a first data table and displayed on a display device of the machine. The system may then identify any additional data tables where information related to the selection reside. Selection criteria based on the additional data tables may be created. A generic report adapted to select any information from any data table may then use the selection criteria to retrieve the information from the additional data tables. The report 116 may then be displayed.

Figure 2:
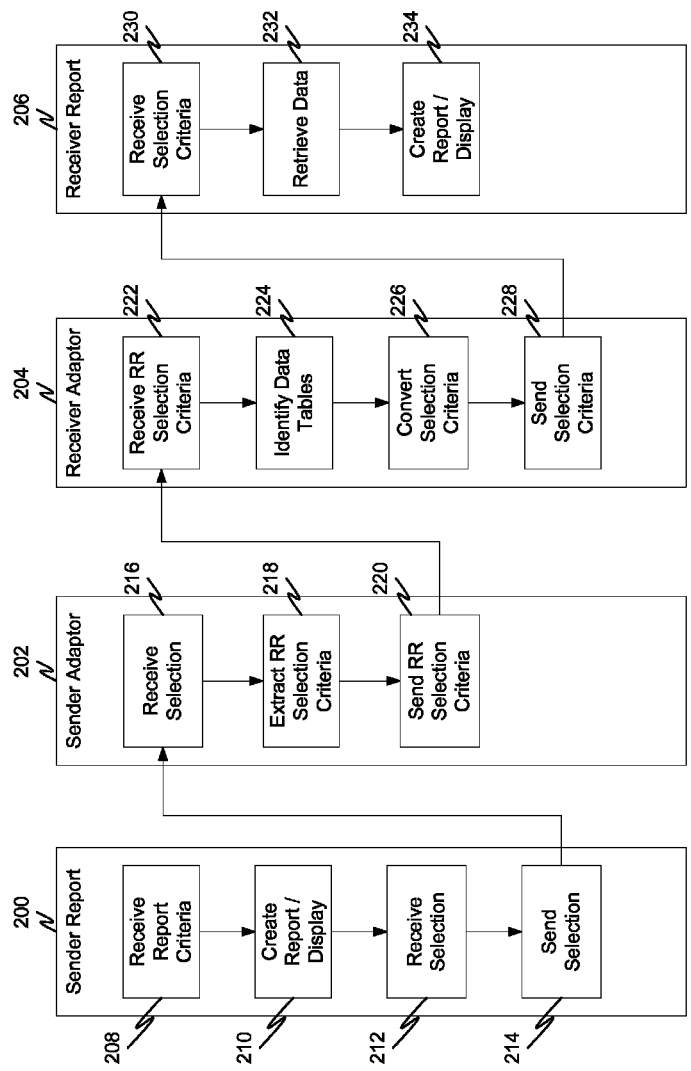
FIG. 2 is a representative flow diagram to provide a general report-to-report connection.

FIG. 2 is a representative flow diagram to provide a general report-to-report connection. The representative embodiment may comprise a sender report 200, a sender adaptor 202, a receiver adaptor 204 and a receiver report 206. The sender report 200 may receive report criteria that define what information should be selected and displayed in the sender report 200. The operation 208 illustrates receiving the report criteria. The report criteria may be entered by a user via a machine adapted to display an appropriate user interface or may be received from another entity such as another system, program, service, etc.

The sender report 200 may be created and/or displayed on a display device of a machine adapted to not only create/display the report information (e.g., operation 210) but also to receive a selection of some or all of the displayed information (e.g., operation 212) from, for example, a user. Once a user selects information on the sender report 200 and indicates a desire to establish a report-to-report link, the selection indicating the selected information is received as indicated by operation 212. Sender report 200 may then send the selection to the sender adaptor 202 as indicated by operation 214.

The sender adaptor 202 receives the selection as indicated in operation 216. The sender adaptor 202 may know the report criteria used to generate the sender report 200. These report criteria may be in the form of a read or select statement to retrieve the data used to create the sender report 200. The sender adaptor 202 may also know any conditions associated with the sender report 200 and the columns that are displayed. Thus, the sender adaptor 202 may extract report-to-report selection criteria from the received selection as indicated by operation 218. Report-to-report selection criteria may include any information needed by receiver adaptor 204 to identify appropriate data tables where relevant information resides. For example, in some embodiments, a data dictionary or other entity may contain information about the table relationships and may pass the information as part of the report-to-report selection criteria. In some embodiments, extracting report-to-report selection criteria may comprise taking the information in the selection such as what columns and/or rows were selected, identifying the data fields and/or data values in the columns and/or rows and placing the information in an appropriate format. Once the report-to-report selection criteria have been extracted (operation 218), it is sent to, or placed in, an appropriate location as indicated by operation 220. In the embodiment of FIG. 2 the information is sent to the receiver adaptor 204. In alternative embodiments, the information may be sent to a report-to-report adaptor, such as report-to-report adaptor 318 of FIG. 3. In still other embodiments, the information may be placed in a data store or other location for retrieval.

The receiver adaptor 204 obtains the report-to-report selection criteria in operation 222. At a minimum, report-to-report selection criteria may include information to allow the report-to-report adaptor to identify the data fields and/or values that have been selected. From this information, the receiver adaptor 204 may identify the data tables that have related information as indicated by operation 224. By way of example, and not limitation, related information may include information that supports and/or corresponds to the selected information (such as supporting detail for summarized and/or aggregated data, controlling documents for selected data, master data display, line items for specific selection criteria, and so forth), contains the selected information (such as value(s) and/or text string(s), and so forth), and/or some combination thereof. Related information may be identified, for example, based on report and/or data table relationships. By way of example, and not limitation, some underlying ERP and/or other lines of business systems may use a data dictionary that contains data definitions and/or other metadata about the data in the system. Information such as data tables, views on data tables, data elements/types, structure components, domains (e.g., technical characteristics of table field(s) and structure component(s)), and so forth may be stored in such a data dictionary. A data dictionary may be one source of information to identify where related information resides. Relationships between tables (whether or not they are stored in the data dictionary) may also be a source of information to identify where related information resides.

Operation 224 may include two fundamental operations: 1) identify what related information exists; and 2) identify the data table(s) where the related information is located. To identify what related information exists, the receiver adaptor 204 may examine relationships between the selected data fields and/or values. For example, if the selected information is an aggregation of all cost centers per controlling area, the sources of the aggregated data may be identified (for example by searching the data dictionary, table relationships, initial sender report information, etc.). To identify where the related information is located (e.g., which data tables, structures, and so forth contain the information), the receiver adaptor 204 may perform a similar evaluation.

In some embodiments, the initial report selection (e.g., operation 212) may include multiple fields and/or values. Such a selection may result in related information residing in multiple tables, perhaps stored in multiple databases across the system. In such a situation, database operations such as various types of joinder operations may be performed on the multiple tables so that related information is brought together in an appropriate format. An example of this is discussed below in conjunction with FIG. 4.

Depending on various factors such as where related information resides, whether related information resides in multiple tables, and/or whether database operations were performed on the data tables, the report-to-report selection criteria may need to be modified. Operation 226 illustrates any modification to the report-to-report needed to extract the related information from the appropriate location(s). The resultant selection criteria may be in the form of one or more select statements to be executed or may include the information from which such select statement(s) may be created.

Operation 228 sends the selection criteria (the report-to-report selection criteria and/or a version modified by operation 226).

The receiver report 206 obtains the selection criteria in operation 230, retrieves the related data in operation 232 and may create and/or display the receiver report 206 in operation 234.

As an example of how this might work in an illustrative embodiment, suppose sender report 200 uses a main table (Table A) and displays an aggregated activity report. A user selects a line from the report as shown in operation 212. The sender adaptor 202 may receive the selection criteria (e.g., the selected line) in operation 216 and extracts the information in operation 218 from the report and sends it to the receiver adaptor 204 (operations 220 and 222). The receiver adaptor 204 uses the received selection criteria and relationship information in a data dictionary to identify a table containing detail information (Table B) in operation 224. The receiver adaptor 204 then converts the received selection criteria to fields to be selected from Table B in operation 226. This is then sent to the receiver report 206 in operations 228 and 230. Data is retrieved (operation 232) and displayed (operation 234).

Figure 3:
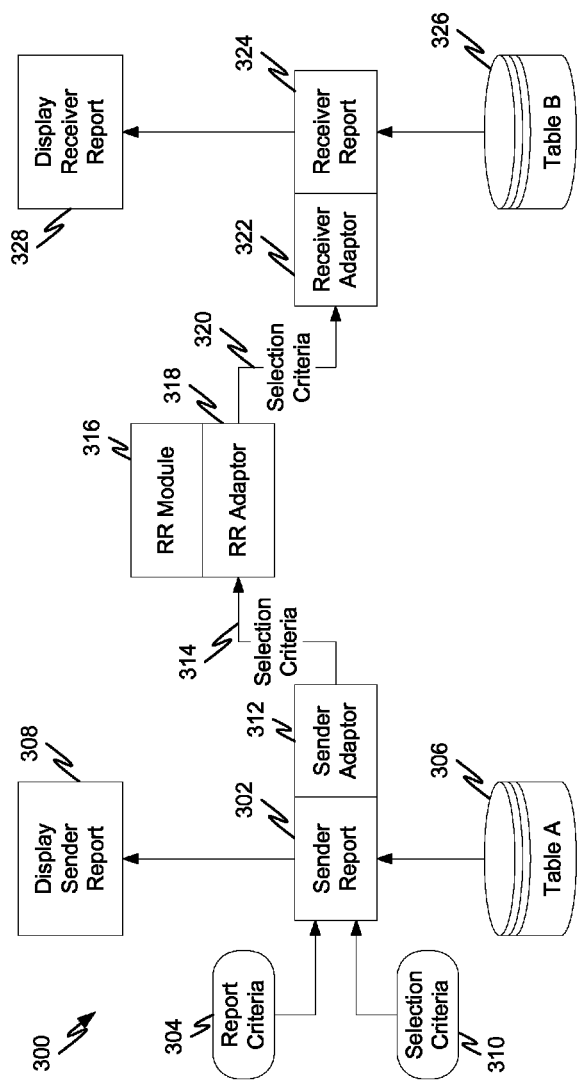
FIG. 3 is a diagram illustrating a representative architecture to provide a general report-to-report connection.

FIG. 3 is a diagram illustrating a representative architecture to provide a general report-to-report connection. The architecture, shown generally as 300 may comprise a sender report 302. The sender report 302 may be a generic data report that is able to read any data from any data table or combination of data tables. In such embodiments the sender report 302 may be a sort of generic data browser or a more traditional report associated with a database (or multiple databases) that may retrieve data meeting any selection criteria. In other embodiments, the sender report 302 may be limited such that the range of applicable selection criteria is more circumscribed. When a generic report is used, the sender report 302 may receive any report criteria 304 and read data from any data table as illustrated by the data table A 306. If a more restricted report is used, the sender report 302 may receive report criteria 304 consistent with the design of the sender report 302 and the data retrieved (e.g., information from data table A 306) is consistent with report criteria 304.

The information in the sender report 302 may be displayed as indicated by operation 308. Displaying the information may be performed using a machine that not only allows display of information, but also allows receipt of input from a user or other entity. In the report-to-report scenario of FIG. 3, a user may select a portion or all of the displayed data and indicate that a second report should be generated based on data related to the selection. Operation 310 represents this process (e.g., selection of all or part of the displayed data and indicating that a report of related data should be generated).

The sender adaptor 312 may be associated with the sender report 302. The sender adaptor 312 includes functionality that extracts and/or converts the selection to appropriate report-to-report selection criteria. The sender adaptor 312 may thus be a component or module associated with sender report 302. Alternatively, the functionality provided by the sender adaptor 312 may be incorporated into the logic of the sender report 302. The form of the selection 310 as it comes to the sender adaptor 312 may be a select statement, other selection criteria, information from which a select statement could be derived, the raw selected data (e.g., the rows and/or columns selected), or combinations thereof. Depending on the exact form of the selection 310 as it arrives to the sender adaptor 312, the sender adaptor 312 may be able to just extract the appropriate report-to-report selection criteria, or the sender adaptor 312 may need to create the appropriate report-to-report selection criteria. For example, if the selection includes a row within the sender report 302 that contains an aggregation of controlling documents for a particular cost center, then the sender adaptor 312 may identify the appropriate data fields and/or values that would identify the selection of that information. In this example, perhaps that includes the cost center, a geographic region, and so forth. The resultant report-to-report selection criteria may include these items (e.g., cost center, geographic region, and so forth). Thus, report-to-report selection criteria may include any information needed by the receiver adaptor 322 to identify appropriate data tables where relevant information resides. In some embodiments, extracting report-to-report selection criteria may comprise taking the information in the selection such as what columns and/or rows were selected, identifying the data fields and/or data values in the columns and/or rows and placing the information in an appropriate format.

Once the report-to-report selection criteria have been created/extracted, it is sent to, or placed in, an appropriate location as indicated by arrow 314. In the embodiment of FIG. 3 the report-to-report selection criteria may be sent to the report-to-report adaptor 318. In one embodiment, report-to-report adaptor 318 includes functionality that stores the received report-to-report selection criteria and then provides the stored report-to-report selection criteria 320 to the receiver adaptor 322.

As illustrated in FIG. 3, the report-to-report adaptor 318 may be associated with a report-to-report module 316. The report-to-report module 316 may provide the report-to-report framework to coordinate all the various functionality in FIG. 3. For example, report-to-report module 316 may provide a unified interface between any kind of sender report and any kind of receiver report. In addition, the report-to-report module may call additional tools/functionality to perform additional processing on the selection criteria 314 before being sent to receiver adaptor 322. In a multi-system environment the report-to report module 316 may also use a remote function call or other remote functionality to hand over the selection criteria to another system. The report-to-report module 316 may also create a new screen to display the receiver report instead of using the current screen of the sender report. Finally, report-to-report module 316 may identify (or ask a user to identify) which receiver report should be used is multiple appropriate receiver reports may fit a particular sender report and/or selection criteria. For example, a user selects aggregated data for a cost center. The report-to-report module 316 (and/or receiver adaptor 322) additionally identifies a cost element that is related the selected data. If two master data reports exist, one for master cost element data and one for master cost center data, the report-to-report module 316 may identify which should be called. These represent only examples of functionality that may be provided and not all embodiments have all, or even any, of this functionality.

The receiver adaptor 322 includes functionality to identify information related to the selection 310 from the report-to-report selection criteria 320, to identify where the related information resides, and to modify and/or create selection criteria that allows retrieval of the related information.

The receiver adaptor 322 obtains the report-to-report selection criteria 320 as illustrated. The report-to-report selection criteria 320 may include information to identify the data fields and/or values that have been selected (e.g., selection 310). From this information, the receiver adaptor 322 may identify the data tables that have related information. By way of example, and not limitation, related information may include information that supports and/or corresponds to the selected information (such as supporting detail for summarized and/or aggregated data, controlling documents for selected data, master data display, line items for specific selection criteria, and so forth), contains the selected information (such as value(s) and/or text string(s), and so forth), and/or some combination thereof. Related information may be identified, for example, based on report and/or data table relationships. By way of example, and not limitation, some underlying ERP and/or other line of business systems may use a data dictionary that contains data definitions and/or other metadata about the data in the system. Information such as data tables, views on data tables, data elements/types, structure components, domains (e.g., technical characteristics of table field(s) and structure component(s)), and so forth may be stored in such a data dictionary. A data dictionary may be one source of information to identify where related information resides. Relationships between tables (whether or not they are stored in the data dictionary) may also be a source of information to identify where related information resides.

To identify what related information exists, the receiver adaptor 322 may examine relationships to the selected data fields and/or values. For example, if the selected information is an aggregation of all cost centers per controlling area, the sources of the aggregated data may be identified (for example by searching the data dictionary, table relationships, initial sender report information, etc.). To identify where the related information is located (e.g., which data tables, structures, and so forth contain the information), the receiver adaptor 322 may perform a similar evaluation. Sometimes these two evaluations (e.g., identifying what related information exists and the location of the related information) may occur at the same time (e.g., identifying what information exists yields the storage locations). Other times two separate inquiries may be used.

Different embodiments may have various ways of identifying relationships. By way of example, and not limitation, business logic may be defined which relate tables to each other from a business perspective (e.g., total tables to line item tables). In another example, a data dictionary may store table definitions (as previously described) so that relationships may be identified via the data dictionary. In yet a further example, different applications may have relationships between them. Such relationships may indicate relationships between tables or other documents used by the different applications. Thus, tables used by one application may have counterpart tables used by another, related application.

The initial report selection (e.g., selection 310) may include multiple fields and/or values. Such a selection may result in related information residing in multiple tables, perhaps stored in multiple databases across the system. In such a situation, database operations such as various types of joinder operations may be performed on the multiple tables so that related information is brought together in an appropriate format. An example of this is discussed below in conjunction with FIG. 4.

Depending on various factors such as where related information resides, whether related information resides in multiple tables, and/or whether database operations were performed on the data tables, the report-to-report selection criteria 314 may need to be modified. The receiver adaptor 322 includes functionality to make any modification to the report-to-report needed to extract the related information from the appropriate location(s). Such modification may include, for example, constructing one or more database operations such as select statements and/or join statements in order to create selection criteria that may be utilized by receiver report 324 to extract the desired report-to-report information. The selection criteria used by receiver report 324 to retrieve the desired information may take the form of one or more database operations such as select statements, or may be information from which such database operations may be constructed.

The receiver adaptor 322 may pass the appropriate selection criteria to receiver report 324, and receiver report 324 may retrieve the desired information, such as table B 326 and, if desired, display the information as illustrated by operation 328.

To summarize FIG. 3, a sender report 302 containing multiple rows and/or columns of information drawn from a data table 306 may be displayed to a user of a machine. A user may select all or a portion of the displayed information. A sender adaptor 312 may extract report-to-report selection criteria 314 from the selected information. A receiver adaptor 322 may identify other data tables 326 where information related to the report-to-report selection criteria 320 resides. If such information resides in multiple data tables, the receiver adaptor 322 may join the multiple data tables into one or more data tables. The receiver adaptor 322 may convert the report-to-report selection criteria 320 into selection criteria for the identified data table(s) and/or joined data table(s). The selection criteria may be passed to a generic receiver report 324 adapted to retrieve any information from any data table(s). The generic receiver report 324 may retrieve information according to the selection criteria and display the information 328 to the user.

Figure 4:
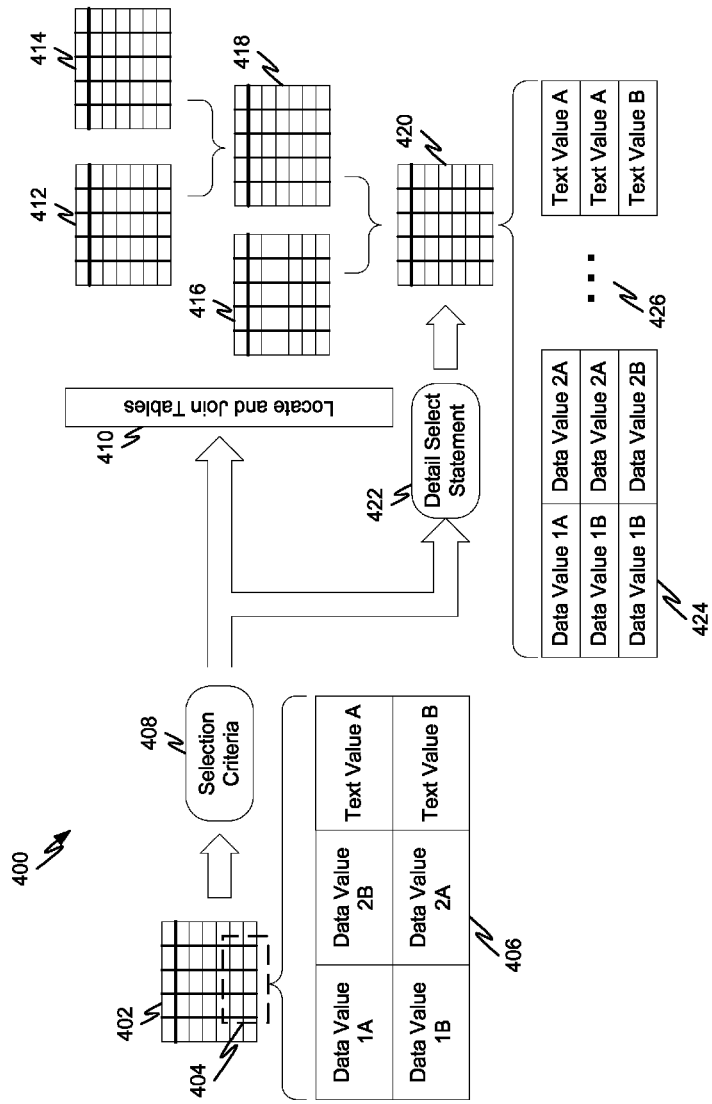
FIG. 4 is a diagram illustrating information selection from a report and selection criteria derived from the selected information.

FIG. 4 is a diagram illustrating information selection from a report and selection criteria derived from the selected information. This example, shown generally as 400, illustrates how multiple columns in a selection may lead to database operations like a join operation. In this example, the sender report 402 is displayed to a user and a user selects a portion of the displayed data 404. The table 406 shows an enlarged version of the selected region where three columns and two rows are selected. The first selected column contains data value 1A and data value 1B. The second selected column contains data value 2A and data value 2B and the third column contains text value A and text value B.

The information in the table 406 may be converted into report-to-report selection criteria 408 as previously described. Report-to-report selection criteria 408 may describe the related data that should be located. In this example, the related data is all supporting records that contain data value 1A, data value 1B, data value 2A, data value 2B, text value A or text value B.

Operation 410 illustrates the process of locating the related information. In this example, assume the related data of data value 1A and data value 1B exist in table 412, the related data of data value 2A and data value 2B exist in table 414 and the related data of text value A and text value B exist in table 416.

In such a situation, tables 412 and 414 may be joined along the appropriate field to produce table 418. The text table 416 may then be joined along an appropriate field to table 418 to produce table 420. Table 420 now contains the appropriate related information as shown in the enlarged view 424. In the enlarged view 424, the ellipses 426 illustrate that any number of additional columns that may be added to the table 420 as part of the join operations.

The selection criteria 408 may then be modified into an appropriate detailed select statement 422 to select the related information from table 420.

Figure 5:
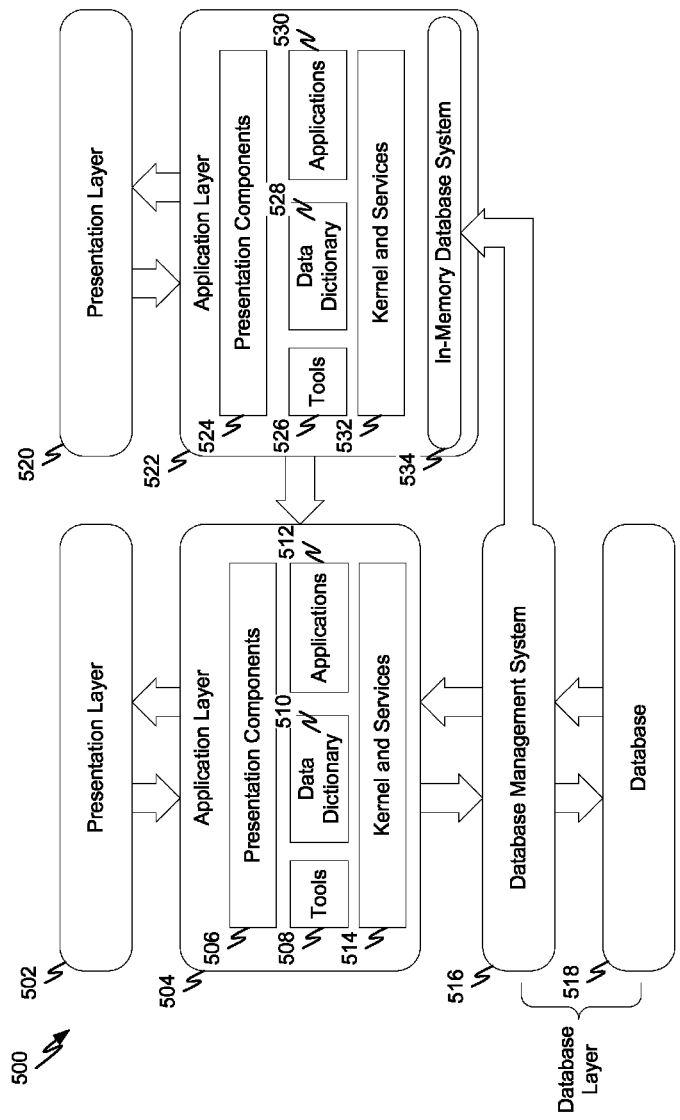
FIG. 5 illustrates use of an in-memory database in one of two configurations in conjunction with the methodologies discussed herein.

FIG. 5 illustrates use of an in-memory database in one of two configurations (shown generally as 500) in conjunction with the methodologies discussed herein. The use of generic reports that may select data from any column of any data table may be facilitated by the use of an in-memory database that can select any column in a database table without the need for a specific index. Also, systems may have very large tables with thousands, tens of thousands or hundreds of thousands of entries, implementations that use database systems to handle the tables and implement the described methods may benefit from in-memory database technology. One example of a suitable in-memory database is the HANA in-memory database system available from SAP AG of Walldorf, Germany In-memory database systems do not necessarily always maintain all data within memory at all times, but the relevant data is in memory when it needs to be and many-fold improvements are seen using these systems over traditional disk based systems.

Like the HANA in-memory database system, the system of FIG. 5 illustrates two separate deployments, a side-by-side deployment where the in-memory database is deployed in conjunction with a traditional disk based database system and a stand-alone deployment where the in-memory database system is deployed without a traditional disk based database system. Thus not every component illustrated in FIG. 5 may be provided for every specific embodiment.

The embodiment of FIG. 5 may represent a side-by-side deployment where an in-memory database is deployed alongside a standard database management system. This may have several benefits, including acceleration of data read and/or writes. A side-by-side type of deployment may also allow acceleration without substantial changes in the existing deployment infrastructure or technologies. In one type of side-by-side deployment, reads and/or writes that would normally be directed to the traditional database are handled by the in-memory database instead. The in-memory database may interact with database management system 516 and/or database 518.

Such a side-by-side deployment may include presentation layer 502, application layer 504, database management system 516, database 518 and in-memory database system 534, possibly deployed in either the same application layer (e.g., 504) or a different application layer (e.g., 522). An application layer 504, 522 may comprise presentation components (e.g., 506, 524). Presentation components may include components such as screen interpreter(s), interfaces, dialog control, etc. An application layer 504, 522 may also comprise kernel and services (e.g., 514, 532). Kernel and services may include components such as an interpreter and/or other components that implement the runtime environment. An application layer 504, 522 may also comprise tools (e.g., 508, 526) and/or applications (e.g., 512, 530). An application layer 504, 522 may also comprise a data dictionary (e.g., 510, 528) to provide information, data structures, definitions, etc. in a database independent format. These data dictionaries may include information used by various embodiments as previously described.

FIG. 5 may also illustrate a stand-alone deployment where an in-memory database runs in the application layer 522 along with any applications 530 and/or tools 526. In this type of deployment, presentation layer 520 supports application layer 522. In-memory database system 534 provides the database support. The other components (e.g., presentation layer 502, application layer 504, database management system 516 and database 518) do not exist in a stand-alone deployment.

Figure 6:
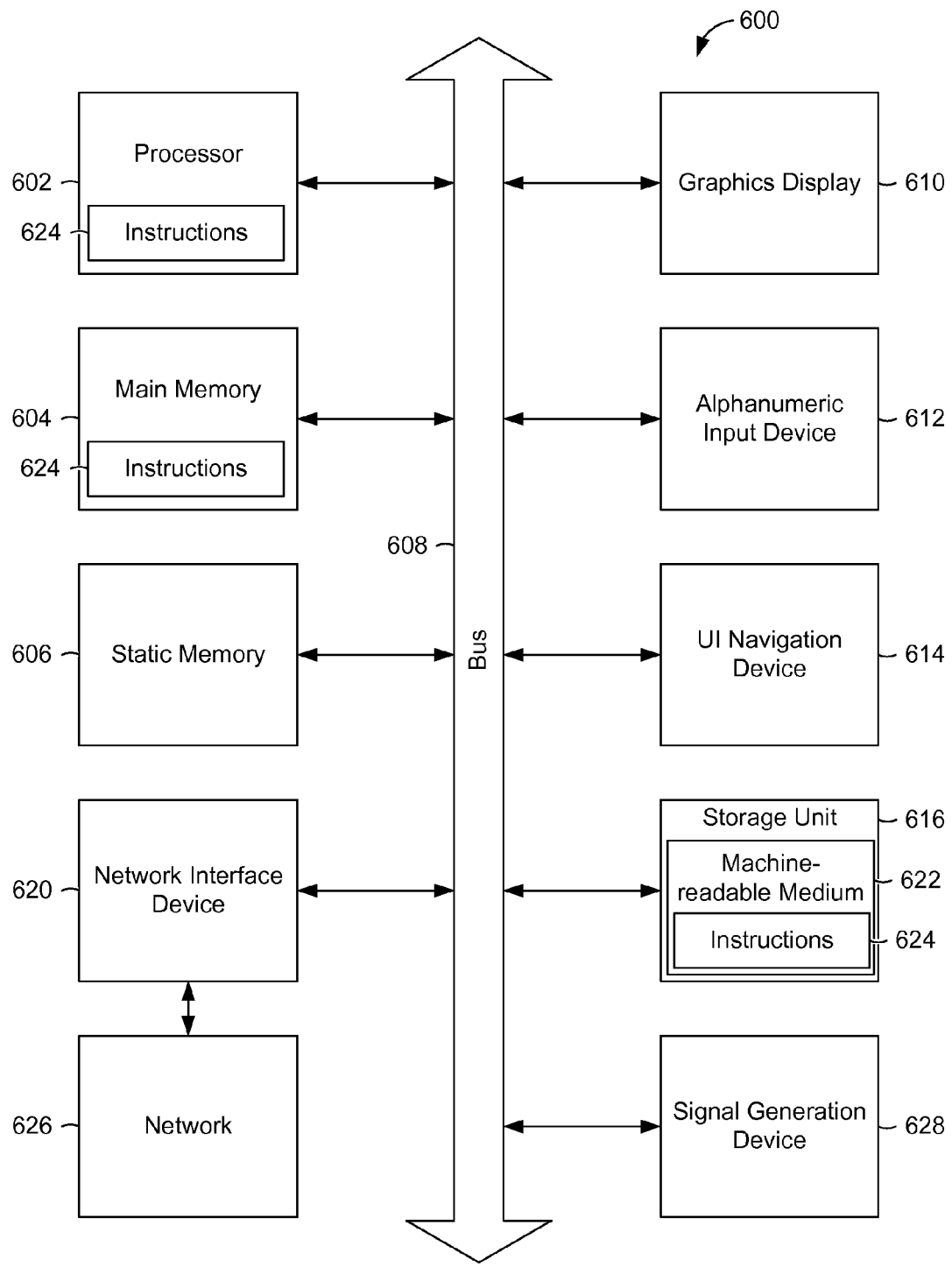
FIG. 6 is a block diagram of a computer processing system, within which a set of instructions for causing the computer to perform any one or more of the methodologies discussed herein may be executed.

FIG. 6 is a block diagram of a computer processing system 600, within which a set of instructions 624 for causing the computer to perform any one or more of the methodologies discussed herein may be executed.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

In addition to being sold or licensed via traditional channels, embodiments may also, for example, be deployed by software-as-a-service (SaaS), application service provider (ASP), or utility computing providers. The computer may be a server computer, a personal computer (PC), a tablet PC, a set-top box (STB), a personal digital assistant (PDA), cellular telephone, or any processing device capable of executing a set of instructions 624 (sequential or otherwise) that specify actions to be taken by that device. Further, while only a single computer is illustrated, the term "computer" shall also be taken to include any collection of computers that individually or jointly execute a set (or multiple sets) of instructions 624 to perform any one or more of the methodologies discussed herein.

The example computer processing system 600 includes a processor 602 (e.g., a central processing unit (CPU), a graphics processing unit (GPU), advanced processing unit (APU) or some combination thereof), a main memory 604 and static memory 606, which may communicate with each other via a bus 608. The computer processing system 600 may further include a graphics display 610 (e.g., a plasma display, a liquid crystal display (LCD) or a cathode ray tube (CRT) or other display). The processing system 600 may also include an alphanumeric input device 612 (e.g., a keyboard), a user interface (UI) navigation device 614 (e.g., a mouse, touch screen, or the like), a storage unit 616, a signal generation device 628 (e.g., a speaker), and/or a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer processing system 600, with the main memory 604 and the processor 602 also constituting computer-readable, tangible media.

The instructions 624 may be transmitted or received over a network 626 via a network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions 624. The term "machine-readable medium" shall also be taken to include any medium that is capable of storing, encoding or carrying a set of instructions 624 for execution by the computer and that cause the computer to perform any one or more of the methodologies of the present application, or that is capable of storing, encoding or carrying data structures utilized by or associated with such a set of instructions 624. The term "machine-readable medium" shall accordingly be taken to include, but not be limited to, solid-state memories, and optical and magnetic media. The term "machine-readable storage medium" does not include signals or other intangible mechanisms. Such intangible media will be referred to as "machine-readable signal media." The term "machine-readable media" will encompass both "machine-readable storage media" and "machine-readable signal media."

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, should not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, modules, operations, or structures described herein as a single instance. Finally, boundaries between various components, modules, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure, module, or component. Similarly, structures and functionality presented as a single module or component may be implemented as separate modules or components. These and other variations, modifications, additions, and improvements fall within the scope of the claims and their equivalents.

What is claimed is:

1. A method comprising:
   receiving from a sender report, using a processor of a machine, a selection of some or all information from the sender report, the sender report generated from a first data table and displayed on a display device of the machine;
   creating, based on the selection, a selection criteria that identifies at least one additional data table where information related to the selection resides;
   sending the selection criteria to a receiver report adapted to receive selection criteria and adapted to select information from a data table; and
   selecting information from the at least one additional data table based on the selection criteria.

2. The method of claim 1 wherein the at least one additional data table resides in a database separate from the first data table.

3. The method of claim 1 wherein the selection comprises a plurality of information contained in rows and/or columns of the sender report and wherein the creating operation produces information to identify the information contained in the rows and/or columns of the sender report.

4. The method of claim 3, further comprising creating database operations to join multiple additional data tables before selecting information based on the selection criteria.

5. The method of claim 4, wherein the multiple additional data tables reside in a database separate from the first data table.

6. The method of claim 3, wherein the selection criteria comprises multiple selection criteria.

7. The method of claim 1 wherein creating the selection criteria comprises:
   identifying data fields, data values, or combinations thereof contained in rows, or columns, or combinations thereof, of the selection from the sender report; and
   placing the identified data fields, data values, or combinations thereof in a format for sending to the receiver report.

8. A system comprising:
   memory;
   a computer processor coupled to the memory;
   instructions stored in the memory and executable by the processor, the instructions comprising:
      a sender report to display report results produced in accordance with the sender report and to receive a selection of some or all of the displayed report results;
      a sender adaptor to receive the selection from the sender report, and to extract a report-to-report selection criteria from the selection;
      a receiver adaptor to obtain the report-to-report selection criteria, to identify a target data table where information resides relating to the report-to-report selection criteria, and to create a selection criteria for the target data table from the report-to-report selection criteria; and
      a receiver report to receive the selection criteria for the target data table and to execute the selection criteria for the target data table.

9. The system of claim 8, wherein the instructions further comprise a report-to-report adaptor to receive the report-to-report selection criteria and to provide the report-to-report selection criteria to the receiver adaptor.

10. The system of claim 9, wherein the report-to-report adaptor is further configured to store the report-to-report selection criteria.

11. The system of claim 8, wherein the receiver adaptor is further configured:
    to identify multiple target data tables where information relating to the report-to-report selection criteria resides; and
    to create database operations to join the multiple target data tables.

12. The system of claim 11, wherein the selection criteria operates on joined multiple target data tables.

13. The system of claim 8, wherein the sender report is further configured to extract displayed information from a sender data table and wherein the sender data table and the target data table reside in different databases.

14. The system of claim 8, wherein the selection comprises multiple displayed information and wherein the report-to-report selection criteria includes criteria for the multiple displayed information.

15. A non-transitory machine-readable storage medium comprising instructions that, when executed by at least one processor of a machine, perform operations comprising:
    receive a selection of information from a report generated from a first data table and displayed on a display device of the machine;
    create a selection criteria based on the selection;
    send the selection criteria to a generic report, the generic report adapted to select information from any data table where data relevant to the selection criteria reside; and
    select information based on the selection criteria.

16. The non-transitory machine-readable storage medium of claim 15, wherein the data relevant to the selection criteria reside in data table in a database separate from a database where the first data table resides.

17. The non-transitory machine-readable storage medium of claim 15, wherein the selection comprises a plurality of information and wherein the selection criteria selects data from multiple additional data tables.

18. The non-transitory machine-readable storage medium of claim 17, wherein the multiple additional data tables reside in a database separate from the first data table.

19. The non-transitory machine-readable storage medium of claim 17, wherein the instructions further configure the machine to create database operations to join the multiple additional data tables before selecting information based on the selection criteria.

20. The non-transitory machine-readable storage medium of claim 19, wherein the instructions further configure the machine to modify the selection criteria to extract information from the joined multiple additional data tables.

* * * * *